(12) United States Patent
Amro et al.

(10) Patent No.: US 6,326,952 B1
(45) Date of Patent: Dec. 4, 2001

(54) METHOD AND APPARATUS FOR DISPLAYING AND RETRIEVING INPUT ON VISUAL DISPLAYS

(75) Inventors: Hatim Yousef Amro, Austin; Miller Paul Van Eaton, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/065,740

(22) Filed: Apr. 24, 1998

(51) Int. Cl.$^7$ ............................................. G09G 5/00
(52) U.S. Cl. ................................... 345/168; 345/172
(58) Field of Search .................................. 345/168, 169, 345/170, 172, 145, 173

(56) References Cited

U.S. PATENT DOCUMENTS

| | | | |
|---|---|---|---|
| 5,084,832 | 1/1992 | Yamada et al. | 364/567 |
| 5,105,220 | 4/1992 | Knodt et al. | 355/209 |
| 5,148,155 | * 9/1992 | Martin et al. | 340/712 |
| 5,243,430 | * 9/1993 | Emmons | 359/146 |
| 5,377,358 | * 12/1994 | Nakamura | 395/800 |
| 5,459,488 | 10/1995 | Geiser | 345/173 |
| 5,487,141 | 1/1996 | Cain et al. | 395/135 |
| 5,500,936 | 3/1996 | Allen et al. | 395/156 |
| 5,573,457 | 11/1996 | Watts et al. | 453/31 |
| 5,612,719 | 3/1997 | Beernink et al. | 345/173 |
| 5,926,170 | * 7/1999 | Oba | 345/168 |
| 5,936,611 | * 8/1999 | Yoshida | 345/158 |
| 6,002,390 | * 12/1999 | Masui | 345/173 |

* cited by examiner

*Primary Examiner*—Vijay Shankar
(74) *Attorney, Agent, or Firm*—Andrea Pair Bryant; Richard A. Henkler; Leslie A. Van Leeuwen

(57) ABSTRACT

A method and apparatus for implementing the keys of a visual keyboard so that each key can perform multiple functions without the prior or simultaneous selection of differing visual keys. Each key is divided into quadrants each of which provide a different function which is well recognized and understood by the end user.

18 Claims, 3 Drawing Sheets

METHOD AND APPARATUS FOR DISPLAYING AND RETRIEVING INPUT ON VISUAL DISPLAYS

BACKGROUND

1. Field of the Present Invention

The present invention generally relates to computer systems, and more particularly, to methods and apparatuses which display and retrieve information from visual displays.

2. Description of the Related Art

The use of computers for simplifying every aspect of life has increased beyond the hopes of even most optimistic analysts. In fact, the appetite of the consumer for fast, efficient, and accurate information has required many new innovations for providing such information. Many of these innovations as a result of either their size or location are often absent a physical keyboard type input device. Consequently, any type of information retrieval must be performed visually. Many of the systems used today use a visual keyboard and a touch screen to retrieve the required information.

Unfortunately, many of these systems fail to reduce the number of times the user must locate the required keys to input the desired information. In other words, as the user is providing the information and selecting the appropriate visual key to do so, the selected key is often limited to performing a single function absent the prior or simultaneous selection of other visual keys. As a result, the user is typically required to select various visual keys which may be remotely located one from another in order to enter the required information. The above noted process not only disorientates, but frustrates the user with respect to the amount of effort that is required in order to enter information.

It would, therefore, be a distinct advantage to have a method and apparatus which would allow the user to select a single visual key for multiple functions without the simultaneous or prior selection of differing visual keys. The present invention provides such a method and apparatus.

SUMMARY OF THE PRESENT INVENTION

The present invention implements the keys of a visual keyboard so that each key can perform multiple functions without the prior or simultaneous selection of differing visual keys. Each key is divided into quadrants each of which provide a different function which is well recognized and understood by the end user.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Figure 1:
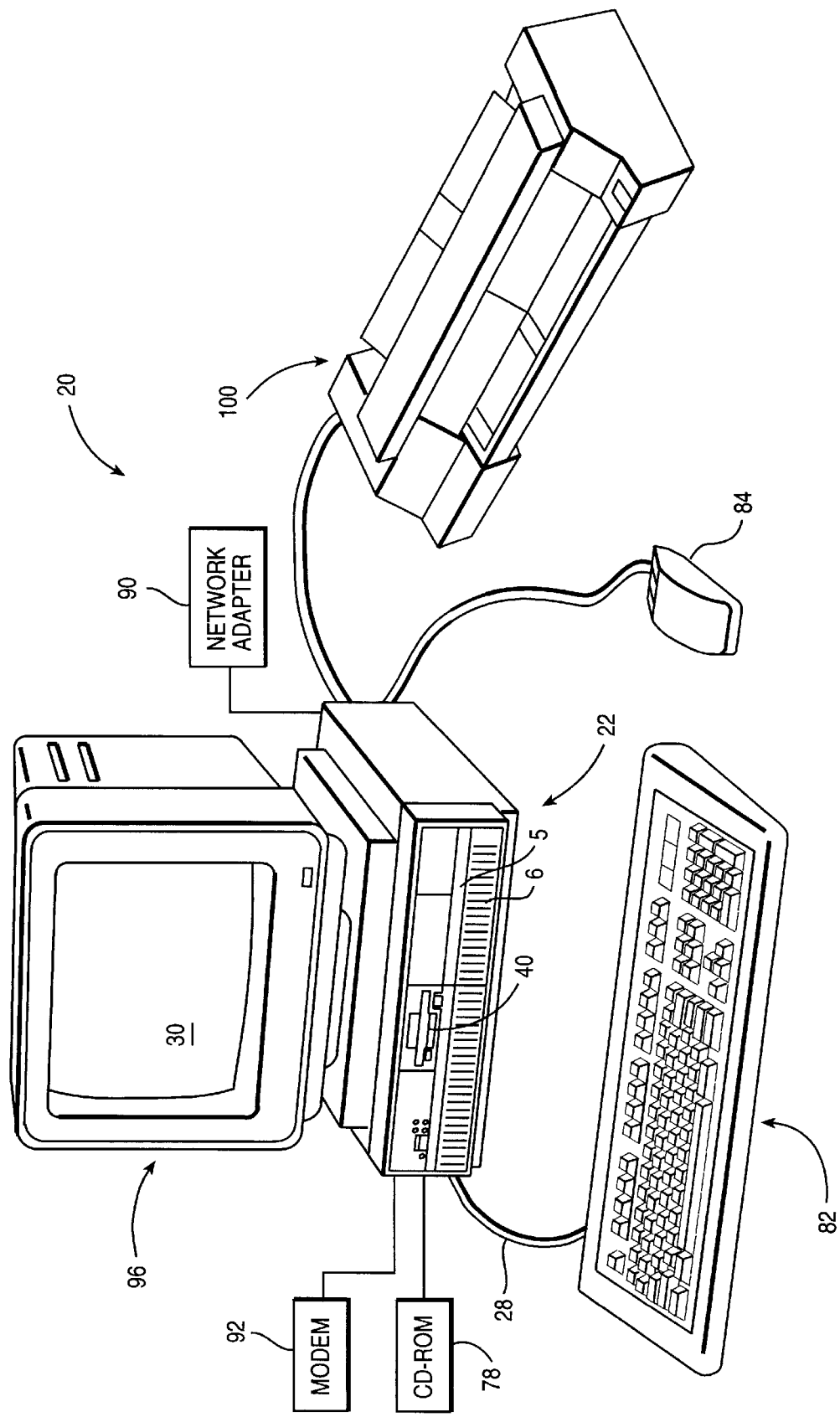
FIG. 1 is a diagram of a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
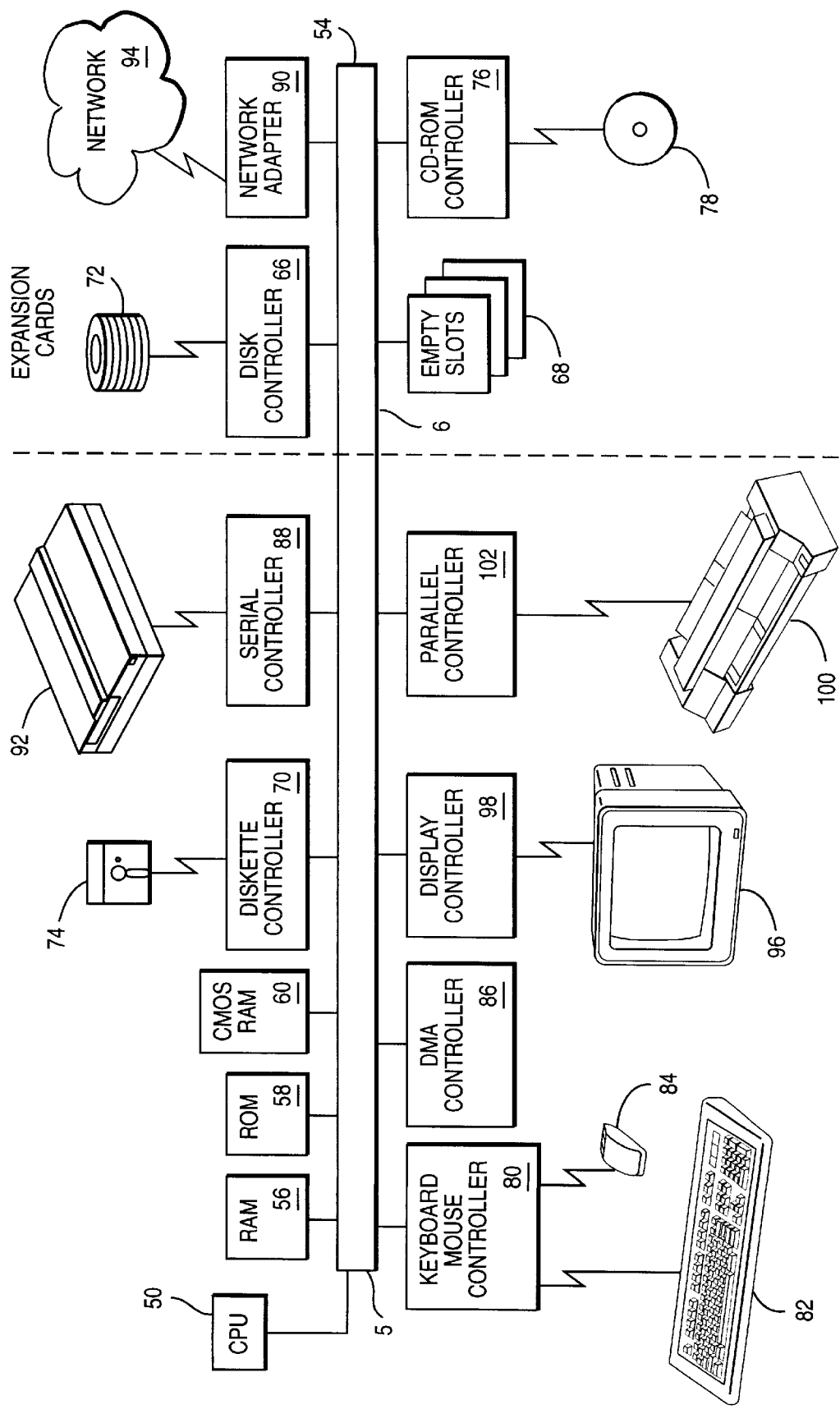
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not loose data when power is removed from it. Nonvolatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the track ball, the track pad, and the pointing device sold under the trademark "Track Point" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

The present invention is particularly useful in environments which use a visual keyboard for retrieving information. Previous such visual environments required the user to perform multistage key selection in order to enter the appropriate information. For example, where the user was required to enter information in both upper and lower case characters, each time the user desired to enter information in upper case characters, the user had to select the shift key either prior to or in combination with the key representing the character for capitalization. The user often becomes disenchanted with such visual displays since the amount of work required to enter the information is often overwhelming.

The present invention eliminates the above noted problems of having to either select prior to or in combination with the desired visual key in order to enter the appropriate information. Specifically, each visual key is divided into quadrants each of which represents a differing functional aspect.

Figure 3:
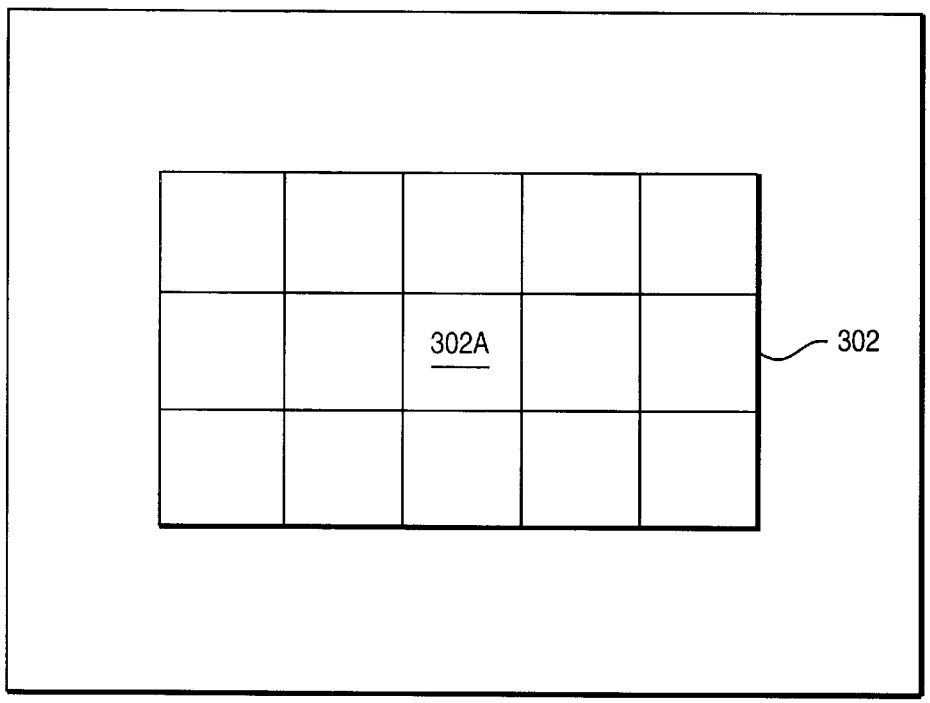
FIG. 3 is a diagram illustrating a visual keyboard 302 being displayed on the display of FIG. 1 in accordance with the teachings of the present invention.

Reference now being made to FIG. 3, a diagram is shown illustrating a visual keyboard 302 being displayed on the display of FIG. 1 in accordance with the teachings of the present invention. Visual keyboard 302 includes a number of keys each of which operate in functionality similar to key 302*a* which is described in greater detail in connection with FIG. 4. The purpose, function, and operation of visual keyboards are well understood and known by those skilled in the art, and therefore, further discussion concerning their purpose is deemed unnecessary.

It should be noted, however, that the visual keyboard 302 could represent any number of keys including a full set, a subset, or any combination thereof.

Figure 4:
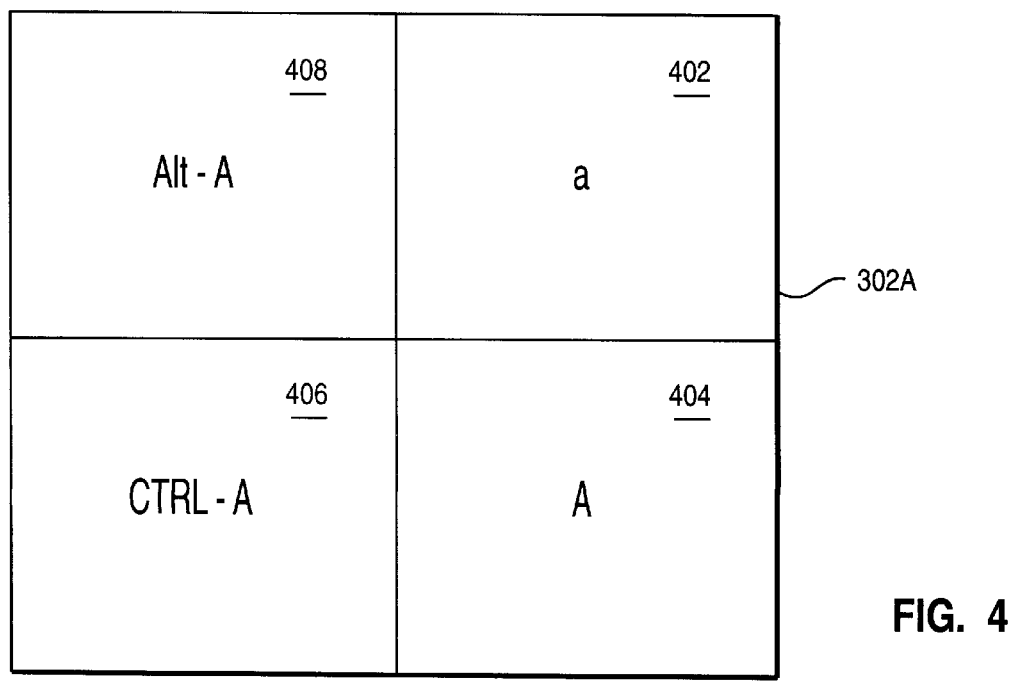
FIG. 4 is a diagram illustrating the visual key 302a of FIG. 3 in greater detail according to the teachings of the present invention.

Reference now being made to FIG. 4, the visual key 302*a* of FIG. 3 is illustrated in greater detail according to the teachings of the present invention. In the preferred embodiment of the present invention, visual key 302*a* has been divided into four distinct quadrants. It should be understood that the number of quadrants for which visual key 302*a* is divided is application specific, and therefore, the preferred number shown is not to be considered a limitation with respect to the many different combinations of quadrants for which the visual key 302*a* can represent (e.g. three, five, eight . . . etc).

In the preferred embodiment illustrated, the visual key 302*a* represents the key "A" on any standard or subset of the standard keyboard. As noted, the visual key A 302 has been divided into four quadrants 402–408. Each of these quadrants 402–408 represent a distinct functional aspect of the visual key A 302. Specifically, quadrant 402 represents the lower chase character "a", quadrant 404 represents the upper case character "A", quadrant 406 represents the character key "a" in combination with the control key function, and quadrant 408 represents the character key "a" in combination with the alt key function.

It can be seen from the above noted quadrants 402–408 that the user is able to select a single particular visual key from the keyboard 302 for performing multiple functions. For example, depending upon the particular environment in which the keyboard 302 is implemented, the user could either touch or click a particular quadrant 402–408 and the correct combination or non-combination key would be produced. Assume that the user selected quadrant 406. The combination key CTRL-A (i.e. control in combination with the key "a") would be produced. In yet another example, the selection of quadrant 404 would produce the combination key Shift-A (i.e. the selection of the shift key in combination with the key "a").

The determination of the which quadrant 402–408 is being selected by the user can be performed in numerous fashions depending upon the particular environment in which the visual keyboard 302 is operating. For example, if visual keyboard 302 is used in a touch screen environment, then an approximation based upon the quadrant having the most pixels touched would be selected.

Although an illustrative embodiment of the present inventions and their advantages have been described in detail herein above, it has been described as example and not as limitation. Various changes, substitutions and alterations can be made in the illustrative embodiment without departing from the breadth, scope and spirit of the present inventions. The breadth, scope and spirit of the present inventions should not be limited by the illustrative embodiment, but should be defined only in accordance with the following claims and equivalents thereof.

What is claimed is:

1. A method of retrieving input from a visual keyboard, the method comprising the steps of:
   creating a plurality of keys each of which are divided into at least four distinct quadrants, each of the quadrants having a function equivalent to the represented key being used in combination with another differing key;
   selecting one of the quadrants of one of a key; and
   producing the corresponding combination for the selected quadrant.

2. The method of claim 1 wherein the step of creating includes the step of:
   creating, for each one of the keys, a first quadrant representing the combination of the key with the control key.

3. The method of claim 2 wherein the step of creating includes the step of:
   creating, for each one of the keys, a second quadrant representing the combination of the key with the Shift key.

4. The method of claim 3 wherein the step of creating includes the step of:
   creating, for each one of the keys, a third quadrant representing the combination of the key with the Alt key.

5. The method of claim 4 wherein the step of selecting one of the quadrants of a key includes the step of:
   selecting the first quadrant of a key.

6. The method of claim 5 wherein the step of producing the corresponding combination includes the step of:
   producing the control key in combination with the selected key.

7. An apparatus for retrieving input from a visual keyboard, the apparatus comprising:
   means for creating a plurality of keys each of which are divided into at least four distinct quadrants, each of the quadrants having a function equivalent to the represented key being used in combination with another differing key;
   means for selecting one of the quadrants of one of said key; and
   means for producing the corresponding combination for the selected quadrant.

8. The apparatus of claim 7 wherein the means for creating includes:
   means for creating, for each one of the keys, a first quadrant representing the combination of the key with the control key.

9. The apparatus of claim 8 wherein the means for creating includes:
   means for creating, for each one of the keys, a second quadrant representing the combination of the key with the Shift key.

10. The apparatus of claim 9 wherein the means for creating includes:
    means for creating, for each one of the keys, a third quadrant representing the combination of the key with the Alt key.

11. The apparatus of claim 10 wherein the means for selecting one of the quadrants of a key includes:
    means for selecting the first quadrant of a key.

12. The apparatus of claim 11 wherein the means for producing the corresponding combination includes:
    means for producing the control key in combination with the selected key.

13. A computer program product comprising:
    a computer readable usable medium having computer readable program code means embodied in the medium for retrieving input from a visual keyboard, the computer readable program code means including:
      means for creating a plurality of keys each of which are divided into at least four distinct quadrants, each of the quadrants having a function equivalent to the represented key being used in combination with another differing key;
      means for selecting one of the quadrants of one of a key; and
      means for producing the corresponding combination for the selected quadrant.

14. The computer program product of claim 13 wherein the means for creating includes:
    means for creating, for each one of the keys, a first quadrant representing the combination of the key with the control key.

15. The computer program product of claim 14 wherein the means for creating includes:
    means for creating, for each one of the keys, a second quadrant representing the combination of the key with the Shift key.

16. The computer program product of claim 15 wherein the means for creating includes:
    means for creating, for each one of the keys, a third quadrant representing the combination of the key with the Alt key.

17. The computer program product of claim 16 wherein the means for selecting one of the quadrants of a key includes:
    means for selecting the first quadrant of a key.

18. The computer program product of claim 17 wherein the means for producing the corresponding combination includes:
    means for producing the control key in combination with the selected key.

* * * * *